United States Patent [19]

Witherspoon

[11] Patent Number: 5,054,231
[45] Date of Patent: Oct. 8, 1991

[54] FIRE ANT ERADICATION APPARATUS AND METHOD

[76] Inventor: Phynus R. Witherspoon, 114 N. Polk, DeSoto, Tex. 75115

[21] Appl. No.: 407,234

[22] Filed: Sep. 14, 1989

[51] Int. Cl.⁵ .......................... A01M 1/20; A01M 7/00
[52] U.S. Cl. .......................................... 43/124; 43/130; 43/900; 43/132.1
[58] Field of Search ............... 43/124, 900, 132.1, 43/130; 111/7.1; 137/891; 239/3, 271, 318, 379

[56] References Cited

U.S. PATENT DOCUMENTS

| | | | |
|---|---|---|---|
| 2,306,165 | 12/1942 | Irish | 111/7.1 |
| 2,761,734 | 6/1955 | Farmer. | |
| 2,893,334 | 7/1959 | Snyder | 111/7.1 |
| 3,122,325 | 5/1962 | Mahrt et al. . | |
| 3,303,800 | 3/1964 | Young . | |
| 3,770,205 | 11/1973 | Proctor et al. . | |
| 3,894,662 | 7/1975 | Eddy et al. . | |
| 3,940,069 | 2/1976 | Gunzel, Jr. et al. . | |
| 3,964,689 | 6/1976 | Horvath, Jr. . | |
| 4,005,976 | 2/1977 | Rombach et al. . | |
| 4,160,336 | 7/1979 | Query et al. . | |
| 4,349,157 | 9/1982 | Beiswenger et al. . | |
| 4,491,254 | 1/1985 | Viets et al. . | |

OTHER PUBLICATIONS

Ross Root Feeders Advertisements.
Gilmour Foamaster Product Information.
Miracle-Gro Product Information.
Ortho Technical Bulletin No. 137 (Revised).
Ortho Product Bulletins: (1) All Purpose Lawn Garden Hose and Sprayer; (2) Dial'n Spray; (3) Spray-ette 4; (4) Lawn Sprayer; (5) Tree & Shrub Spray-ette; (6) Weed Killer Sprayer.
Texas Department of Agriculture Imported Fire Ant Control Techniques.

*Primary Examiner*—Kurt Rowan

[57] ABSTRACT

A method for eradicating fire ants includes connecting a supply of pressurized water to a dispenser handle, forcing water or a water and insecticide mixture out a vertical probe to drench the top of the fire ant mound, slowly inserting the probe into the fire ant mound with the water or water and insecticide mixture flowing, and then slowly pulling the probe out of the mound while flooding the mound with the water and insecticide mixture. A dispenser for accomplishing the method includes a handle that may be attached to a source of pressurized water, a bottle attached to the handle containing insecticide, a vertical probe attached to the handle for injecting water and insecticide into a fire ant mound, a conduit to allow water to pass from the pressurized source through the handle and out the probe, and a means of aspirating insecticide into the water flowing through the handle and the probe.

13 Claims, 2 Drawing Sheets

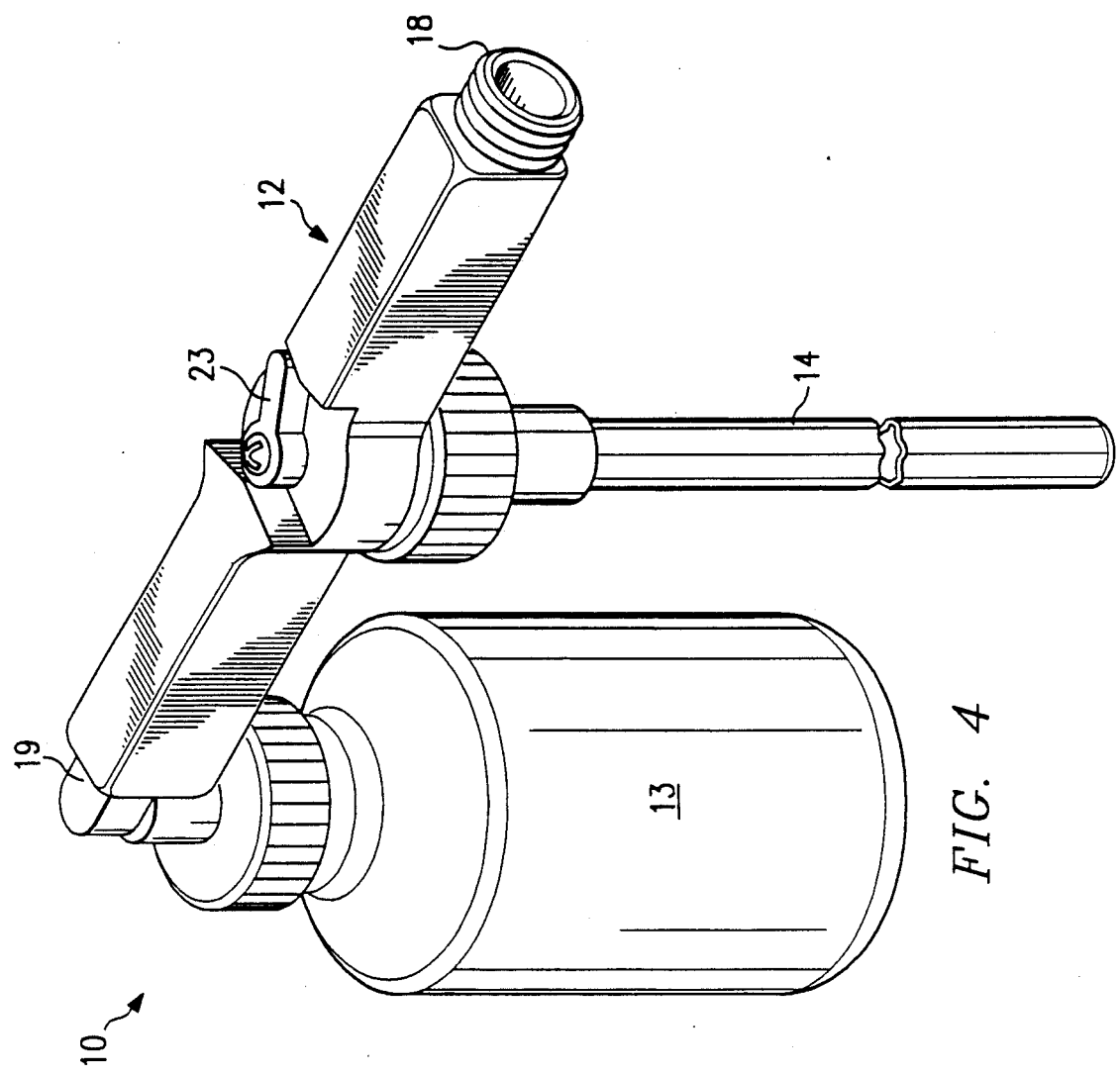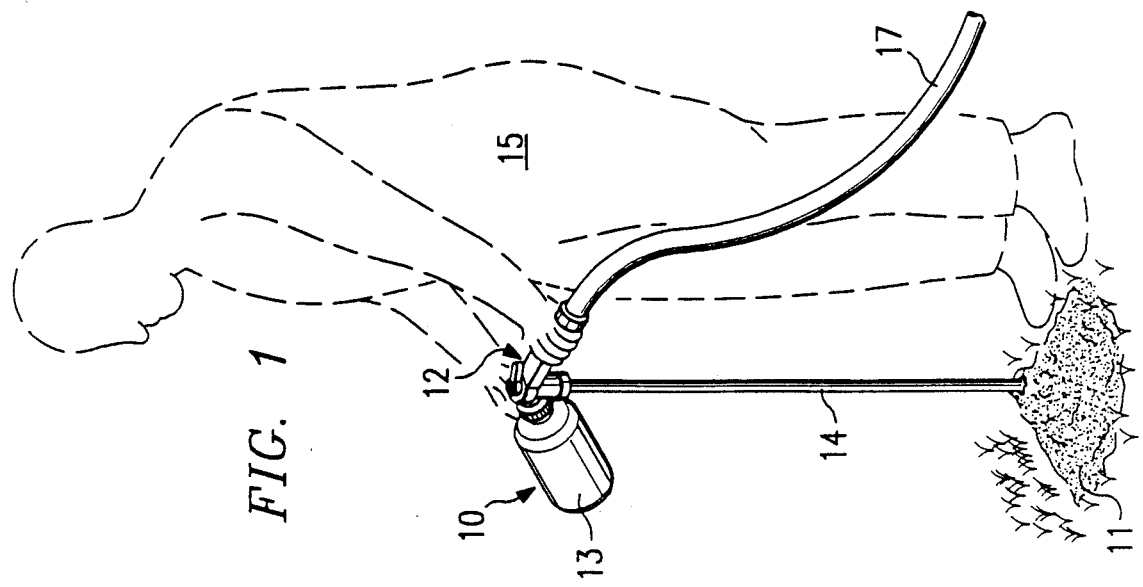

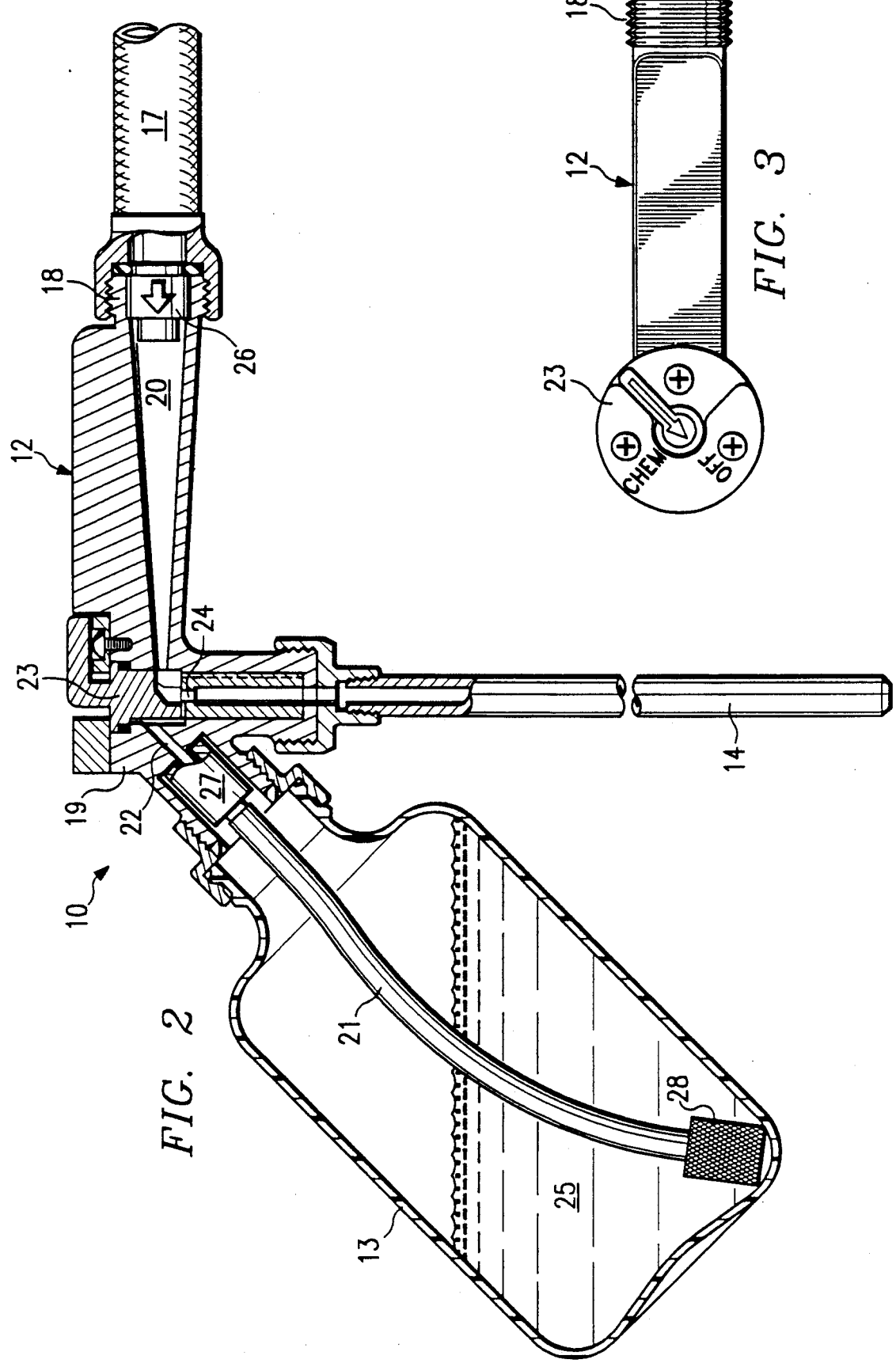

FIRE ANT ERADICATION APPARATUS AND METHOD

BACKGROUND OF THE INVENTION

The present invention relates to an apparatus and method for insect control and specifically for eradication of the various species of imported South American fire ant.

The imported fire ant has been a destructive pest in the United States for decades. As described in U.S. Pat. No. 4,756,118 to Evans, the imported fire ant has caused significant destruction throughout large portions of the United States and is eventually expected to inhabit most of the United States. Common fire ant mounds are two to four feet deep in most parts of the United States, but as described in the '118 patent, a fire ant mound may extend twenty feet beneath the surface, with lateral tunnels extending 75 feet outward. One mound may contain 300,000 individual ants.

The fire ant is an intensely defensive creature that is difficult to eradicate. Disturbing a fire ant mound usually causes the colony to attack the source of the disturbance. Each ant bite leaves a small welt or sore on the victim and thus an attack by a horde of ants can be extremely painful. The colony can be evacuated quickly and the ants protect the queens in each colony. In fact, most experts counsel against any type of subsurface attack on a fire ant mound because the ants will escape or attack the intruder.

Numerous methods of controlling the ant have been devised. Some methods involve topically applying a mixture of several gallons of water and a fire ant poison to drench the mound. Other methods involve sprinkling granular poison onto the mound and drenching the mound with water. Unfortunately, because of the extensive nature of the mounds, the topical application of poisons frequently is not effective to destroy the entire fire ant mound and thus queens from the colony may escape to establish new fire ant colonies.

Other methods developed thus far include products that may be injected into the fire ant mound. For instance, the '118 patent to Evans describes an apparatus that injects intense heat, vapors, insecticides and even steam directly into the mound. U.S. Pat. No. 4,160,336 to Query describes injecting an insecticide and a refrigerant into the fire ant mounds.

These injection techniques involve expensive, often dangerous equipment that typically may only be used by professionals. The injection products described by the Texas Department of Agriculture are available to ordinary consumers but are very expensive. Home owners typically have been required to use the only partially effective topical application techniques. As a result, there is an intense demand for some method that effectively controls fire ants without the dangers and expense inherent in prior devices so that home owners and other amateurs may safely combat the pests.

SUMMARY OF THE INVENTION

The present invention provides a relatively simple and inexpensive dispenser for injecting insecticide into fire ant mounds to kill fire ant colonies. The dispenser design permits deep, sub-surface penetration of a water and insecticide mixture into a fire ant mound that floods the entire mound and kills the fire ant colony without the expense or danger associated with earlier fire ant control apparatus. Rather than employing a high pressure, high temperature apparatus, the dispenser holds insecticide that is aspirated into water flowing under household pressure and is injected by the water pressure through an attached probe deep into the fire ant mound.

More specifically, the dispenser according to a preferred embodiment of the invention may be attached on one end to a garden hose and on the other end to bottle of insecticide so that any ordinary homeowner may use the dispenser. Water from the hose passes through the dispenser and into a probe attached to the middle of the dispenser handle and extending two or three feet vertically downward from the handle. A venturi in the handle causes the flowing water to aspirate insecticide from the bottle into the flowing water so that a mixture of water and insecticide flows out of the probe. The handle has a valve to control the flow of water and insecticide through the dispenser.

According to the method of the present invention, the probe is inserted deep into a fire ant mound with water and insecticide flowing out of the probe and, as the probe is slowly withdrawn from the mound, the entire mound is flooded with insecticide and water to kill the fire ants. More specifically, the water/insecticide mixture flowing out of the probe is first dispensed over the external surface of the mound to kill any fire ants active on the surface or immediately below the surface and to loosen and soften the dirt in the mound so that the probe may be pushed deep into the mound. The probe is then slowly withdrawn from the mound, pumping water and insecticide deep inside the fire ant mount and flooding the tunnels of the mound to kill the queens and other ants throughout the mound. The flowing water facilitates insertion of the probe into the mound and also assists in dispersion of the insecticide throughout the mound.

The simple dispenser and method of the present invention permit an average home owner to use the device. No hot gasses, explosives, or expensive, special equipment is required. The insecticide may be a readily available chemical that is safe for non-professional use. Therefore, the dispenser may be used by many people without significant training or expense.

BRIEF DESCRIPTION OF THE DRAWINGS

Other features and advantages of the invention will be apparent from the following Detailed Description taken in conjunction with the accompanying drawings, in which:

FIG. 1 is a perspective view of the dispenser of the present invention being used on a fire ant mound, with the outline of a person in broken lines;

FIG. 2 is a sectional view of a first embodiment of the present invention;

FIG. 3 is a partial top view of the handle of the dispenser shown in FIG. 2; and FIG. 4 is a perspective view of a second embodiment of the dispenser according to the present invention.

DETAILED DESCRIPTION

As shown in the drawings, the present invention is embodied in a dispenser 10 that is used to eradicate fire ants in a fire ant mound 11. The dispenser comprises a handle 12, a bottle 13 for holding insecticide, and a probe 14 extending vertically down from the handle. A user 15 connects the handle to a hose 17 or other source of pressurized water to use the dispenser.

According to the method of the present invention, the dispenser injects a mixture of water and insecticide through the probe and deep into the fire ant mound 11 to flood the tunnels in the mound with insecticide and kill the ants in the mound. Preferably, a mixture of water and insecticide is pumped down through the probe 14 and is applied to the surface of the fire ant mound, killing any ants on the surface and driving the sub-surface ants deeper into the mound to congregate in a relatively limited area for easier treatment with insecticide. The pressurized water from the probe softens the soil and clears a path beneath the ground for the insertion of the probe and also insures dispersal of the insecticide throughout the mound.

The probe 14 is inserted into the softened soil with the water flowing to permit the user 15 to flood the entire mound 11 and all branching tunnels with the water and insecticide mixture. The long probe enables the user to penetrate the depth of the mound, guaranteeing treatment of all the ants and particularly killing of the queens in a relatively short time to eliminate the possibility of excape by fire ants and particularly by queens. Pressure and insecticide are used, but neither is of such intensity or strength as to prevent use of the device by non-professionals.

The hose 17 is attached to a first end 18 of the handle 12, the bottle 13 is attached to a second end 19 of the handle, and the probe 14 is attached in the middle portion of the handle and extends vertically down from the handle. A conduit 20 extends from the first end of the handle into and entirely through the probe so that water from the hose passes through the conduit and out the end of the probe. A tube 21 extends into the bottle 13 and is connected by a passageway 22 through a valve 23 to a small venturi 24 in the conduit. The venturi is used to aspirate insecticide from the bottle into the conduit.

The valve 23 is mounted on the top of the handle 12. According to a preferred embodiment of the invention, the valve has two settings, an "off" position to stop the flow of water and a "chemical" position to open the flow of water and insecticide. When in the "off" position, the valve prevents water from flowing through the conduit. When the valve is in the "chemical" position, the passageway 22 and the venturi 24 are connected so that water flowing through the conduit 20 aspirates insecticide 25 from the bottle 13, through the tube 21 and passageway and into the venturi to mix with the water. The mixture of water and insecticide is then injected into the fire ant mound 11 through the probe 14. The valve preferably eliminates the need for premixing the insecticide with the water because the amount of insecticide aspirated per unit of water may be controlled by the design of the valve and the aspirating tube.

According to another embodiment of the invention, the valve 23 has three positions, a first "off" position, a second, "water" position, and a third, "chemical" position. When in the "water" position, only water from the hose flows through the conduit. The three-position valve has the potential of saving insecticide during the pre-wetting stage of the treatment. However, in view of the small amount of insecticide that is usually saved, and in view of the fact that it is believed to be best constantly to apply insecticide with the water, the three-position valve presently is not the preferred embodiment.

The handle 12 preferably contains two safety valves. A first, anti-siphon check valve 26 comprises a ball bearing mounted in the first end 18 of the handle 12. The anti-siphon valve prevents back pressure such as might be caused by a clog in the probe 14 from forcing insecticide into the hose 17. Such back pressure causes the ball bearing to seat against a seal in the end of the handle to prevent the insecticide/water mixture from entering the hose.

A second check valve 27 is preferably mounted in the end of the tube 21 in the bottle 13. The second check valve includes a small ball bearing that, under the influence of back pressure, seats against the end of the tube. This check valve prevents back pressure from forcing water into the bottle, thereby diluting the insecticide and perhaps even rupturing the bottle. As depicted in FIG. 2, a screen 28 may be attached to the tube 21 to prevent particulates from entering the tube and clogging the passageway 22.

In another embodiment of the invention, the handle 12 of the dispenser 10 includes a lever arm to control the flow of water. The lever arm is similar in concept and design to those known in the art that may be attached to garden hoses. The user is able to vary the water pressure by using varying the pressure on the lever.

The handle may be made of many materials but plastic is preferred. The bottle is preferably made of clear or translucent plastic. The probe may be of any appropriate length but a three foot probe is a good length to penetrate most mounds because most mounds are two to four feet deep. If the probe is slightly too short, the water and insecticide will still seep down into the depths of the fire ant mound and thereby kill fire ants. For deeper mounds, a longer probe may be required, so that the end of the inserted probe reaches deep enough into the mound to insure flooding of the entire mound.

Preferably, the probe is ¼ inch galvanized steel water pipe having an open end. In some circumstances, a probe having a conical, steel end with openings along the side of the probe to permit the water to exit may also be used. However, such a probe frequently does not have the water pressure necessary to drive the probe into compacted ground.

Although one embodiment of the invention has been illustrated and described, various modifications and changes may be made by those skilled in the art without departing from the spirit and scope of the invention.

I claim:

1. A dispenser for killing fire ants comprising:
   a handle having a first end, a second end and a middle portion;
   a threaded connection on the first end of the handle for connecting the dispenser to a supply of pressurized water;
   a bottle threadedly connected to the second end of the handle for holding a supply of fire ant insecticide;
   a probe connected to the middle portion of the handle at an angle of approximately 90° in relation to the first end of the handle;
   a conduit extending from the first end through at least part of the middle portion of the handle and through the entire probe for passing water from the supply of water to the probe;
   means for aspirating insecticide from the bottle into the conduit under the influence of water passing through the conduit; and
   a valve for controlling the flow of water through the conduit and the aspiration of insecticide into the conduit.

2. The dispenser of claim 1 wherein the valve includes a first position for stopping the flow of water and a second position for passing water through the conduit, and aspirating insecticide into the water flow.

3. The dispenser of claim 1 wherein the valve includes a first position for stopping the flow of water, a second position for passing water through the conduit, and a third position for aspirating insecticide into the water flow.

4. The dispenser of claim 1 wherein the means for aspirating insecticide includes a venturi tube in the conduit.

5. The dispenser of claim 1 wherein the means for aspirating insecticide comprises a tube connected to the handle at one end and extending into the bottle and a screen and check valve at the other end of the tube.

6. The dispenser of claim 1 further comprising a check valve mounted in the first end of the handle to prevent the flow of water or insecticide toward the supply of pressurized water.

7. The dispenser of claim 1 further comprising a check valve mounted in the first end of the handle to prevent the flow of water or insecticide toward the supply of pressurized water.

8. The dispenser of claim 1 wherein the handle further comprises a means for regulating the amount of water flowing through the conduit.

9. An apparatus for use in killing fire ants comprising:
a handle having a first end, a second end, and a middle portion;
means for connecting the first end of the handle to a supply of pressurized water;
a source of fire ant insecticide attached to the second end of the handle;
a probe connected to the middle portion of the handle at an angle of approximately 90° in relation to the first end of the handle;
a conduit through the handle for passing water from the supply of water to the probe; and
means for mixing insecticide with the water passing through the conduit.

10. The apparatus of claim 9 wherein the conduit extends from the first end of the handle through at least a portion of the middle portion of the handle and through the entire probe.

11. The apparatus of claim 9 wherein the source of insecticide comprises a bottle attached to the handle.

12. The apparatus of claim 9 wherein the means for mixing insecticide comprises a means for aspirating insecticide from the source and into the conduit under the influence of the water passing through the conduit.

13. The apparatus of claim 9 further comprising means for controlling the proportion of insecticide mixed with the water.

* * * * *